(No Model.)
J. H. ALLEN.
Belt-Tightening Attachment for Sewing-Machines.
No. 228,850. Patented June 15, 1880.
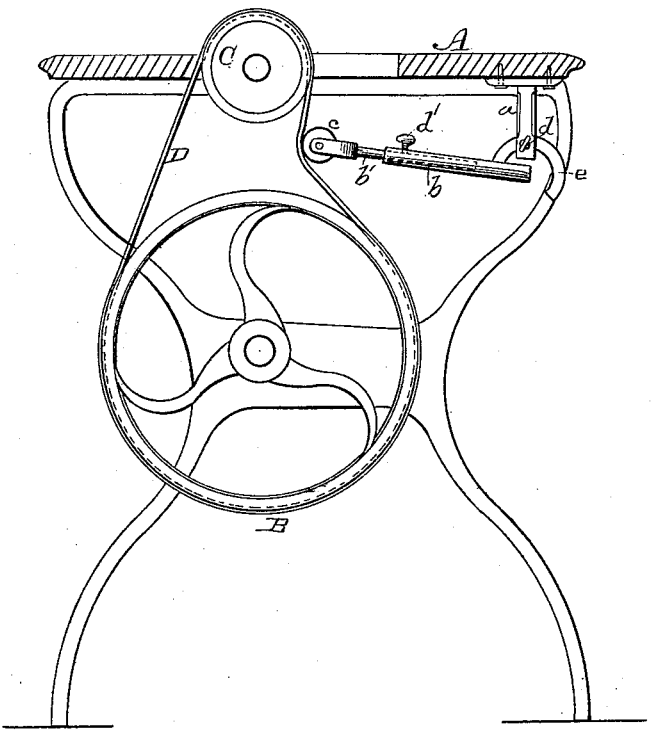
Witnesses
Frank A. Brooks
Geo. H. Strong.
Inventor
Joseph H. Allen
By Dewey & Co.
Attys

UNITED STATES PATENT OFFICE.

JOSEPH H. ALLEN, OF SACRAMENTO, CALIFORNIA.

BELT-TIGHTENING ATTACHMENT FOR SEWING-MACHINES.

SPECIFICATION forming part of Letters Patent No. 228,850, dated June 15, 1880.

Application filed April 21, 1880. (No model.)

*To all whom it may concern:*

Be it known that I, JOSEPH H. ALLEN, of the city and county of Sacramento, and State of California, have invented a Belt-Tightening Attachment for Sewing-Machines; and I hereby declare the following to be a full, clear, and exact description thereof.

My invention relates to certain improvements in belt-tightening attachments for sewing-machines; and my improvements consist in providing a swiveled adjustable arm carrying an adjustable extension with a friction-roller, by means of which the pressure on the belt and the angle of said pressure may be regulated at will, as is more fully shown in the accompanying drawing, which represents a sectional side view of my device.

In my device I provide two adjustments, one of which regulates the pressure and the other of which regulates the point of pressure, throwing it onto the larger or smaller wheel, as desired, thus making a complete adjustment.

Let A represent the table of an ordinary sewing-machine, B the driving-wheel on the treadle-shaft, and C the small belt-wheel communicating the power to the machine on the table. Around the wheels B C runs the usual belt D. At any suitable point on the table in line with the belt is a slotted stud, $a$, to the lower end of which is hinged the curved arm of the bar $b$, this bar being hollow at one end and having inside of it a supplemental bar, $b'$, on the end of which is a roller, $c$, grooved to fit the belt, as shown. On the bar $b$ is a curved arm, $e$, which passes through the slot in the stud $a$, where there is a set-screw, $d$, to control it in any desired position. Another set-screw, $d'$, controls the movement of the sliding supplemental bar $b'$ with relation to the bar $b$.

When the belt is to be tightened the bars $b\ b'$ are swung down, and the set-screw $d$ on the curved arm holds them rigidly in place. Then the supplemental bar $b'$ is extended so as to bring the roller against the belt at any desired pressure, and its set-screw $d'$ adjusted. In this way not only the desired pressure on the belt may be regulated, but the angle of said pressure as well, and each independently of the other. The belt may be pushed against either wheel of the two on which it runs.

In running the machine, where light work is being done the belt may be slack without detriment; but when put on heavy work the belt will slip unless it is tightened. If it is too tight when light work is being done the machine will run heavily. When, therefore, a machine is run on work of varied character, in order that it shall move satisfactorily, the belt should be so arranged as to be readily tightened or loosened at will.

The tightening or loosening of a belt under ordinary circumstances is a source of inconvenience. The little snaps which hold the ends have to be taken out and replaced to alter the length, and require a certain amount of mechanical skill in their arrangement. Those devices designed to overcome these objections do not generally answer the purpose properly, as they are not readily adjustable and are apt to exert the pressure on the belt at an unsuitable angle, which angle cannot be changed.

The arm $b$, carrying the belt-adjusting arm $b'$, may be moved to any angle, and its extension $b'$ set in or out to suit the desired tension of belt.

The device is so simple that it is readily changed, so as to be adjusted for light or heavy work.

Having thus described my invention, what I claim as new, and desire to secure by Letters Patent, is—

The belt-tightening attachment for sewing-machines, consisting of the stud $a$, swiveled hollow bar $b$, with its curved arm $e$ and set-screw $d$, supplemental bar $b'$, and roller $c$, whereby the pressure and the angle of pressure on the belt are independently adjusted, substantially as and for the purpose herein described.

In witness whereof I have hereunto set my hand.

JOSEPH HENRY ALLEN.

Witnesses:
GEO. H. STRONG,
FRANK A. BROOKS.